(12) United States Patent
Wendland et al.

(10) Patent No.: US 12,722,139 B2
(45) Date of Patent: Sep. 1, 2026

(54) POLYMERIC SORBENTS FOR ALDEHYDES AND METHODS OF MAKING

(71) Applicant: 3M INNOVATIVE PROPERTIES COMPANY, St. Paul, MN (US)

(72) Inventors: Michael S. Wendland, North St. Paul, MN (US); Himanshu Jasuja, Woodbury, MN (US); Michael W. Kobe, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1029 days.

(21) Appl. No.: 17/597,740

(22) PCT Filed: Aug. 7, 2020

(86) PCT No.: PCT/IB2020/057494
§ 371 (c)(1),
(2) Date: Jan. 21, 2022

(87) PCT Pub. No.: WO2021/038347
PCT Pub. Date: Mar. 4, 2021

(65) Prior Publication Data

US 2022/0258128 A1 Aug. 18, 2022

Related U.S. Application Data

(60) Provisional application No. 62/893,877, filed on Aug. 30, 2019.

(51) Int. Cl.
*B01J 20/26* (2006.01)
*B01D 53/72* (2006.01)
(Continued)

(52) U.S. Cl.
CPC ............ *B01J 20/261* (2013.01); *B01D 53/72* (2013.01); *B01J 20/265* (2013.01);
(Continued)

(58) Field of Classification Search
CPC .. B01J 20/261; B01J 20/265; B01J 20/28059; B01J 20/28061; B01J 20/28064;
(Continued)

(56) References Cited

U.S. PATENT DOCUMENTS 3,531,463 A 9/1970 Gustafson
3,874,907 A * 4/1975 Gardon ............... A61M 1/3486 428/407
(Continued)

FOREIGN PATENT DOCUMENTS

WO WO2016-081226 5/2016
WO WO2017-106434 6/2017
(Continued)

OTHER PUBLICATIONS

Ahn, "Rapid Generation and Control of Microporosity, Bimodal Pore Size Distribution, and Surface Area in Davankov-Type Hyper-Cross-Linked Resins", Macromolecules, Dec. 2006, vol. 39, pp. 627-632.

(Continued)

*Primary Examiner* — Anthony J Zimmer
*Assistant Examiner* — Logan Laclair
(74) *Attorney, Agent, or Firm* — Adrian L. Pishko

(57) ABSTRACT

Polymeric sorbents for aldehydes including formaldehyde and acetaldehyde are provided. More particularly, the polymeric sorbents are sulfonic acid-containing polymeric materials with impregnated urea-based compounds. Additionally, methods of making the polymeric sorbent, methods of sorbing aldehydes (i.e., aldehydes that are volatile under use conditions) on the polymeric sorbents, compositions resulting from the sorption of aldehydes on the polymeric sorbents, and filters containing the polymeric sorbents are provided.

15 Claims, 1 Drawing Sheet

(51) Int. Cl.
*B01J 20/28* (2006.01)
*B01J 20/30* (2006.01)
*B01J 20/32* (2006.01)
*C08F 8/36* (2006.01)
*C08F 212/08* (2006.01)
*C08F 212/36* (2006.01)

(52) U.S. Cl.
CPC ... *B01J 20/28059* (2013.01); *B01J 20/28061* (2013.01); *B01J 20/28064* (2013.01); *B01J 20/28083* (2013.01); *B01J 20/28085* (2013.01); *B01J 20/3071* (2013.01); *B01J 20/321* (2013.01); *B01J 20/3251* (2013.01); *C08F 8/36* (2013.01); *C08F 212/08* (2013.01); *C08F 212/36* (2013.01); *B01D 2253/202* (2013.01); *B01D 2253/306* (2013.01); *B01D 2257/702* (2013.01); *B01D 2257/708* (2013.01); *B01D 2258/06* (2013.01); *B01J 2220/44* (2013.01); *B01J 2220/4812* (2013.01); *B01J 2220/66* (2013.01)

(58) Field of Classification Search
CPC ............ B01J 20/28083; B01J 20/28085; B01J 20/3071; B01J 20/321; B01J 20/3251; B01J 2220/44; B01J 2220/4812; B01J 2220/66; B01J 20/267; B01J 20/28057; B01J 20/28088; B01J 20/3255; B01J 20/3259; B01D 53/72; B01D 2253/202; B01D 2253/306; B01D 2257/702; B01D 2257/708; B01D 2258/06; B01D 53/02; B01D 2239/0407; B01D 2253/25; B01D 2257/70; C08F 8/36; C08F 212/08; C08F 212/36
See application file for complete search history.

(56) References Cited

U.S. PATENT DOCUMENTS

| | | | | |
|---|---|---|---|---|
| 4,443,354 | A | 4/1984 | Eian | |
| 4,737,173 | A * | 4/1988 | Kudirka | B01D 46/10 55/471 |
| 6,416,487 | B1 | 7/2002 | Braverman | |
| 6,554,886 | B2 | 4/2003 | Yoshikawa | |
| 7,955,570 | B2 | 6/2011 | Insley | |
| 2003/0041735 | A1 * | 3/2003 | Yoshikawa | B01D 53/02 96/417 |
| 2014/0042097 | A1 * | 2/2014 | Chan | B01J 20/3285 210/660 |
| 2017/0333870 | A1 * | 11/2017 | Wendland | C08F 12/32 |

FOREIGN PATENT DOCUMENTS

| | | |
|---|---|---|
| WO | WO2018-229677 | 12/2018 |
| WO | WO2019-166949 | 9/2019 |

OTHER PUBLICATIONS

Davankov, "Structure and Properties of Hypercrosslinked Polystyrene-The First Representative of a New Class of Polymer Networks", Reactive Polymers, 1990, vol. 13, pp. 27-42.

Li, "A New Strategy to Microporous Polymers: Knitting Rigid Aromatic Building Blocks by External Cross-Linker", Macromolecules, 2011, vol. 44, pp. 2410-2414.

Liu, "Unexpected Behavior of 1-Chlorodecane as a Novel Porogen in the Preparation of High-Porosity Poly(divinylbenzene) Microspheres", The Journal of Physical Chemistry C, 2008, vol. 112, No. 34, pp. 13171-13174.

Ma, "Removal of Low-Concentration Formaldehyde in Air by Adsorption on Activated Carbon Modified by Hexamethylene Diamine", Carbon, 2011, vol. 49, pp. 2869-2877.

Matsuo, "Removal of Formaldehyde from Gas Phase by Silylated Graphite Oxide Containing Amino Groups", Carbon, 2008, vol. 46, pp. 1159-1174.

Mohamed, "Porous Copolymer Resins: Tuning Pore Structure and Surface Area with Non Reactive Porogens", Nanomaterials, 2012, vol. 2, pp. 163-186.

Nomura, "Enhanced Formaldehyde-Vapor Adsorption Capacity of Polymeric Amine-Incorporated Aminosilicas", Chemistry—A European Journal, 2014, vol. 20, pp. 6381-6390.

Nyhus, "Formation of the Porous Structure During the Polymerization of meta-Divinylbenzene and para-Divinylbenzene with Toluene and 2-Ethylhexanoic Acid (2-EHA) as Porogens", Journal of Polymer Science: Part A: Polymer Chemistry, 1999, vol. 37, pp. 3973-3990.

Wei, "Solvothermal Synthesis of Highly Porous Polymers and Their Controllable Transition from Macro/Mesoporosity to Meso/Microporosity", Colloids and Surfaces A: Physicochemical and Engineering Aspects, 2012, vol. 414, pp. 327-332.

Wood, "Hydrogen Storage in Microporous Hypercrosslinked Organic Polymer Networks", Chemistry of Materials, 2007, vol. 19, pp. 2034-2048.

Yim, "Removal of Formaldehyde over Amine Functionalized SBA-15", Journal of Nanoscience and Nanotechnology, 2011, vol. 11, No. 2, pp. 1714-1717.

Zhang, "Superhydrophobic Nanoporous Polymers as Efficient Adsorbents for Organic Compounds", Nano Today, 2009, vol. 4, pp. 135-142.

International Search Report for PCT International Application No. PCT/IB2020/057494 mailed on Nov. 9, 2020, 4 pages.

Pine, "Nucleophilic Substitution on Derivatives of Sulfuric and Phosphoric Acids", Organic Chemistry, Fifth Edition, (1987), pp. 303-304.

* cited by examiner

POLYMERIC SORBENTS FOR ALDEHYDES AND METHODS OF MAKING

CROSS REFERENCE TO RELATED APPLICATIONS

This application is a national stage filing under 35 U.S.C. 371 of PCT/IB2020/057494, filed Aug. 7, 2020, which claims the benefit of U.S. Provisional Patent Application No. 62/893,877, filed Aug. 30, 2019, the disclosure of which is incorporated by reference in its/their entirety herein.

BACKGROUND

Formaldehyde is a known carcinogen and allergen. For this reason, the Occupational Safety and Health Administration (OSHA) in the United States has set workplace exposure limits of 0.75 part per million (ppm) of formaldehyde vapor for eight-hour exposure and 2 ppm of formaldehyde vapor for 15-minute exposure. The World Health Organization (WHO) recommends maintaining the amount of formaldehyde in air below 0.08 ppm (30-minute average concentration) to prevent significant sensory irritation in the general population.

Despite its toxicity, formaldehyde is a high volume industrial compound. It is used, for example, to prepare polymeric materials that find widespread use in various building materials including foam insulation, particle board, carpet, paint, and varnish. Out-gassing of residual formaldehyde from these building materials makes formaldehyde one of the most prevalent indoor air pollutants. Formaldehyde is also a by-product of the combustion of organic materials. As a result, formaldehyde is a common outdoor pollutant as well, arising from sources such as automobile exhaust, methane combustion, forest fires, and cigarette smoke.

While in North America strict formaldehyde out-gassing limitations are placed on building materials, this is not the case in all parts of the world. In some Asian countries, for example, few restrictions are placed on building materials. Combined with an increased use of biofuels to heat homes and to run automobiles, dangerous levels of formaldehyde vapor may occur in both indoor and outdoor air. For this reason, there is an immediate need for solutions to mitigate human exposure to formaldehyde vapor both as an indoor and an outdoor air pollutant.

People may spend more than 80 percent of their time indoors, where indoor air pollutants may cause various health problems, including "building related illness" (BRI) and "sick building syndrome" (SBS). It is therefore desirable to reduce the amount of pollutants in indoor air, including the amount of formaldehyde. Materials and methods for capturing aldehydes are needed.

SUMMARY

Polymeric sorbent for aldehydes including formaldehyde and acetaldehyde are provided. More particularly, the polymeric sorbents are sulfonic acid-containing polymeric materials with impregnated urea-based compounds. Additionally, methods of making the polymeric sorbents, methods of sorbing aldehydes (i.e., aldehydes that are volatile under use conditions) on the polymeric sorbents, compositions resulting from the sorption of aldehydes on the polymeric sorbents, and filters containing the polymeric sorbents are provided.

In a first aspect, a polymeric sorbent is provided. The polymeric sorbent includes a sulfonic acid-containing polymeric material that is impregnated with a urea-based compound. The sulfonic acid-containing polymeric material has covalently attached sulfonic acid groups and is the reaction product of a mixture containing 1) a precursor polymeric material comprising a polymerized product of a polymerizable composition that contains aromatic monomers and 2) a sulfonic acid agent.

In a second aspect, a method of making a polymeric sorbent is provided. The method includes obtaining a sulfonic acid-containing polymeric material having covalently attached sulfonic acid groups. The sulfonic acid-containing polymeric material includes a reaction product of a mixture that contains 1) a precursor polymeric material comprising a polymerized product of a polymerizable composition comprising aromatic monomers and 2) a sulfonic acid agent. The method further includes impregnating the sulfonic acid-containing polymeric material with a urea-based compound to form the polymeric sorbent.

In a third aspect, a method of sorbing an aldehyde is provided. The method includes providing a polymeric sorbent as described above in the first aspect and sorbing the aldehyde on the polymeric sorbent, the aldehyde being of Formula (I)

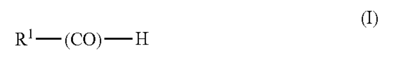
(I)

wherein $R^1$ is hydrogen, alkyl, vinyl, or aryl and wherein the molecular weight of the aldehyde is no greater than 200 grams/mole.

In a fourth aspect, a composition is provided that includes the polymeric sorbent described above in the first aspect and an aldehyde sorbed on the polymeric sorbent. The aldehyde is of Formula (I)

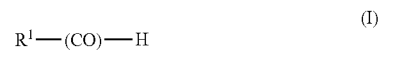
(I)

wherein $R^1$ is hydrogen, alkyl, vinyl, or aryl and wherein the molecular weight of the aldehyde is no greater than 200 grams/mole.

In a fifth aspect, a filter is provided that includes the polymeric sorbent described above in the first aspect.

DETAILED DESCRIPTION

Figure 1:
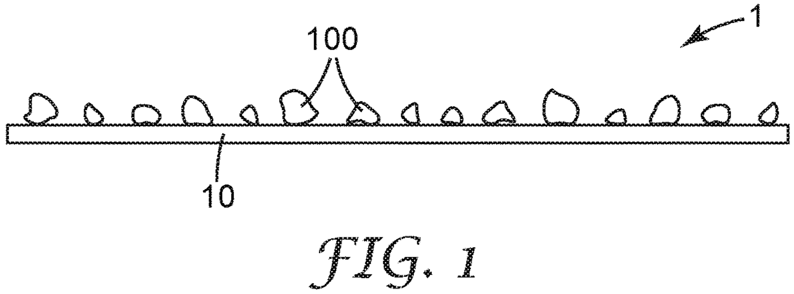
FIG. 1 is a schematic view of a portion of an air filter with a filter support and polymeric sorbent particles dispersed therein according to an embodiment.

Polymeric sorbents are provided. The polymeric sorbents are sulfonic acid-containing polymeric materials that are impregnated with urea-based compounds. The sulfonic acid-containing polymeric materials are the reaction product of a precursor polymeric material and a sulfonic acid agent. The precursor polymeric material is typically formed from aromatic monomers. Additionally, methods of making the polymeric sorbents, methods of sorbing aldehydes on the polymeric sorbents, compositions resulting from sorption of aldehydes on the polymeric sorbents, and filters containing the polymeric sorbents are provided.

Available technologies for removing formaldehyde from indoor air environments include adsorption filtration, ultraviolet photocatalytic oxidation, ozonation, and ionization/plasma. Some technologies, however, pose potential problems due to possible production of harmful intermediates and secondary products, and therefore adsorption filtration is a preferred technology for removing formaldehyde from air. In adsorption filtration, airborne chemicals are removed from the air by physical and/or chemical adsorption (retention) on a solid sorbent.

Formaldehyde is a gas at room temperature, and its high volatility makes it extremely difficult to capture by physisorption alone. Because formaldehyde is reactive, however, it can be more readily captured through chemisorption. With chemisorption, the formaldehyde vapors are captured by chemically reacting with the sorbent itself or with chemicals impregnated into the sorbent.

Some sorbent materials that have been used for capturing formaldehyde are based on an activated carbon scaffold. Activated carbon itself, however, has negligible formaldehyde capacity. Further, the scaffold of activated carbon is relatively inactive, which makes it difficult to incorporate reactive groups into the activated carbon scaffold at a sufficient density. Reactive chemistries (most commonly amines) are, therefore, incorporated by impregnation into activated carbon to make sorbents for formaldehyde. Common impregnation chemistries used with activated carbon include the sodium salt of sulfamic acid, Tris (i.e., tris (hydroxymethyl)-aminomethane), potassium iodide, and some urea-based compounds (e.g., ethylene urea) co-impregnated with phosphoric acid. Various other metal salts have been used as well.

Urea-based compounds and acids (e.g., phosphoric acid) together are effective for capturing formaldehyde. The use of urea-based impregnants (i.e., compounds that can impregnate) have several advantages. First, urea-based compounds typically contain more than one active site in the molecule that can react with formaldehyde. Thus, multiple formaldehyde molecules can be captured by a single urea-based molecule. In the case of ethylene urea, for example, both urea nitrogen groups can react with formaldehyde such that two formaldehyde molecules are captured for every ethylene urea molecule. Therefore, sorbents impregnated with urea-based compounds can show marked improvements over other impregnate chemistries in capacities for formaldehyde. Second, urea-based compounds have very low volatility, making them suitable for use as impregnants because they do not volatilize over time and leach out of the sorbent material. Furthermore, their high solubility in water and ethanol make them very easy to impregnate in high concentrations.

While urea-based impregnants have several advantages, the currently known sorbents experience multiple challenges. For example, the nucleophilicity of the nitrogen groups in urea is low, rendering the urea-based compound not very reactive with formaldehyde by itself. To overcome this lack of reactivity, urea-based impregnants have been co-impregnated with a strong acid, typically a mineral acid such as phosphoric acid (see, e.g., activated-carbon based sorbents discussed above). Also, impregnation in general tends to slow down the kinetics of capture by a sorbent. Although the capacity of the sorbent to capture formaldehyde is greater when the amount of active formaldehyde-capturing compound impregnated into the pores of the sorbent is greater, over-impregnation can substantially fill the pores of the sorbent and ultimately results in such a dramatic decrease in the porosity of the sorbent that access to the impregnated chemistries is cut off and the capacity of the sorbent greatly decreases. The inclusion of the strong acid together with a urea-based compound occupies space within the pores of the sorbent, thus reducing the capacity of the pores. Additionally, some sorbents cannot tolerate acidic conditions.

The polymeric sorbents provided herein have sulfonic acid groups as part of the scaffold that is impregnated with one or more urea-based compounds. The polymeric sorbents do not deteriorate over time in the presence of the sulfonic acid groups.

The terms "a", "an", and "the" are used interchangeably with "at least one" to mean one or more of the elements being described.

The term "and/or" means either or both. For example, "A and/or B" means only A, only B, or both A and B.

The terms "polymer" and "polymeric material" are used interchangeably and refer to materials formed by reacting one or more monomers. These terms include homopolymers, copolymers, terpolymers, or the like. Likewise, the terms "polymerize" and "polymerizing" refer to the process of making a polymeric material that can be a homopolymer, copolymer, terpolymer, or the like.

The terms "polymeric sorbent" and "porous polymeric sorbent" are used interchangeably to refer to a polymeric material that is porous and that can sorb gaseous substances such as, for example, aldehydes.

Porous materials such as the polymeric sorbents can be characterized based on the size of their pores. The term "micropores" refers to pores having diameters less than 2 nanometers. The term "mesopores" refers to pores having a diameter in a range of 2 to 50 nanometers. The term "macropores" refers to pores having diameters greater than 50 nanometers. The porosity of a polymeric sorbent (or the porosity of the precursor polymeric material or the porosity of the sulfonic acid-containing polymeric material) can be characterized for micropores and mesopores from an adsorption isotherm of an inert gas such as nitrogen or argon by the porous material under cryogenic conditions (e.g., liquid nitrogen at 77 K). The adsorption isotherm is typically obtained by measuring adsorption of the inert gas such as nitrogen by the porous polymeric sorbent at multiple relative pressures in a range of about $10^{-6}$ to about 0.98±0.01. The isotherms are then analyzed using various methods such as the BET (Brunauer-Emmett-Teller) method to calculate specific surface area and such as Density Functional Theory (DFT) to characterize the porosity and the pore size distribution. The porosity of a polymeric sorbent (or the porosity of the precursor polymeric material or the porosity of the sulfonic acid-containing polymeric material) can be characterized for mesopores and macropores using techniques such as mercury porosimetry.

The term "sorbing" and similar words such as "sorb", "sorbed", and "sorption" refer to the addition of a first substance (e.g., a gas such as an aldehyde) to a second substance (e.g., a polymeric material such as the polymeric sorbent) by adsorbing, absorbing, or both. Likewise, the term "sorbent" refers to a second substance that sorbs a first substance by adsorbing, absorbing, or both.

The term "surface area" refers to the total area of a surface of a material including the internal surfaces of accessible pores. The surface area is typically calculated from adsorption isotherms obtained by measuring the amount of an inert gas such as nitrogen or argon that adsorbs on the surface of a material under cryogenic conditions (e.g., liquid nitrogen at 77 K) over a range of relative pressures. The term "BET specific surface area" is the surface area per gram of a material (typically, $m^2$/gram) that is usually calculated from adsorption isotherm data of the inert gas over a relative pressure range of 0.05 to 0.30 using the BET method.

The term "polymerizable composition" includes all materials included in the reaction mixture used to form the polymeric material. The polymerizable composition includes, for example, the monomer mixture, the organic solvent, the initiator, and other optional components. Some of the components in the polymerizable composition such as the organic solvent may not undergo a chemical reaction but can influence the chemical reaction and the resulting polymeric material.

The term "monomer mixture" refers to that portion of a polymerizable composition that includes the monomers. To prepare the polymeric sorbent, the monomer mixture contains aromatic monomers such as, for example, styrene-type monomers, divinylbenzene, and bis(chloromethyl) substituted aromatic monomers.

The term "alkyl" refers to a monovalent group that is a radical of an alkane and includes straight chain, branched, cyclic, and bicyclic alkyl groups, and combinations thereof, including both unsubstituted and substituted alkyl groups. Unless otherwise indicated, the alkyl groups typically contain from 1 to 30 carbon atoms. In some embodiments, the alkyl groups contain 1 to 20 carbon atoms, 1 to 10 carbon atoms, 1 to 6 carbon atoms, 1 to 4 carbon atoms, or 1 to 3 carbon atoms. Examples of alkyl groups include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, norbornyl, and the like.

The term "aryl" refers to a monovalent group that is aromatic and, optionally, carbocyclic. The aryl has at least one aromatic ring. Any additional rings can be unsaturated, partially saturated, saturated, or aromatic. Optionally, the aromatic ring can have one or more additional carbocyclic rings that are fused to the aromatic ring. Unless otherwise indicated, the aryl groups typically contain from 6 to 30 carbon atoms. In some embodiments, the aryl groups contain 6 to 20, 6 to 18, 6 to 16, 6 to 12, or 6 to 10 carbon atoms. Examples of an aryl group include phenyl, naphthyl, biphenyl, phenanthryl, and anthracyl.

The term "acyl" refers to a group of formula $-(CO)-R^2$ where $R^2$ is an alkyl or aryl. Examples of an acyl group include methanoyl, ethanoyl, and benzoyl.

The term "vinyl" is also known as ethenyl and refers to the functional group with the formula $-CH=CH_2$.

The term "urea-based compound" refers to a compound having a group of formula $-NH-(CO)-NH-$. The compound can be linear or cyclic.

The term "styrene-type monomers" refers to styrene and/or styrene substituted with an alkyl.

The term "sulfonic acid agent" refers to a compound that is reacted with the precursor polymeric material to form a sulfonic acid-containing polymeric material.

The term "sulfonic acid-containing polymeric material" refers to polymeric material having covalently attached sulfonic acid ($-SO_3H$) groups.

The term "room temperature" refers to a temperature in a range of 20° C. to 30° C., in a range of 20° C. to 25° C., in a range close to and including 25° C., or 25° C.

The recitations of numerical ranges by endpoints include all numbers subsumed within that range as well as the endpoints (e.g., 1 to 5 includes 1, 1.5, 2, 2.75, 3, 3.80, 4, 5, etc.).

The words "preferred" and "preferably" refer to embodiments of the disclosure that may afford certain benefits, under certain circumstances. However, other claims may also be preferred, under the same or other circumstances. Furthermore, the recitation of one or more preferred claims does not imply that other claims are not useful and is not intended to exclude other claims from the scope of the disclosure.

Reference throughout this specification to "one embodiment," "an embodiment," "certain embodiments," "some embodiments," or similar phrases that a feature, configuration, composition, or characteristic described for the embodiment is included in at least one embodiment of the invention. Thus, the appearances of such phrases in various places throughout this specification are not necessarily referring to the same embodiment of the invention. Furthermore, the features, configurations, compositions, or characteristics may be combined in any suitable manner in one or more embodiments.

The polymeric sorbent contains a sulfonic acid-containing polymeric material that is impregnated with urea-based compounds. The sulfonic acid-containing polymeric material has covalently attached sulfonic acid groups and is the reaction product of a mixture containing 1) a precursor polymeric material and 2) a sulfonic acid agent.

The polymeric sorbent is prepared by obtaining (or forming or providing) a sulfonic acid-containing polymeric material having covalently attached sulfonic acid groups. The sulfonic acid-containing polymeric material includes a reaction product of a mixture that contains 1) a precursor polymeric material including a polymerized product of a polymerizable composition containing aromatic monomers and 2) a sulfonic acid agent. The method further includes impregnating the sulfonic acid-containing polymeric material with a urea-based compound to form the polymeric sorbent.

The precursor polymeric material that is reacted with the sulfonic acid agent to form the sulfonic acid-containing polymeric material is typically formed from a polymerizable composition that contains aromatic monomers. Examples of aromatic monomers include, but are not limited to, styrene, styrene substituted with an alkyl group, divinyl benzene, and the like. Other examples of aromatic monomers include styrene substituted with a chloromethyl group (e.g., vinyl benzyl chloride). Other examples of aromatic monomers include bis(chloromethyl)-substituted aromatic monomers (e.g., p-xylylene-dichloride or isomers thereof). In some embodiments, at least 60 weight percent, at least 70 weight percent, at least 80 weight percent, at least 85 weight percent, at least 90 weight percent, or at least 95 weight percent and up to 100 weight percent, up to 99 weight percent, up to 98 weight percent, up to 95 weight percent, or up to 90 weight percent of the monomers in the polymerizable composition are aromatic monomers.

The precursor polymeric material is typically crosslinked. Crosslinking tends to enhance the porosity of the precursor polymeric materials and the resulting polymeric sorbent. Any crosslinking method can be used. For example, in some embodiments, the polymerizable composition contains relatively large amounts of divinyl benzene (e.g., at least 10 weight percent) and no post-polymerization crosslinking is used. In other embodiments, the precursor is crosslinked lightly by the addition of relatively low amounts of divinyl benzene (e.g., 1 to less than 10 weight percent) in the polymerizable composition. Further crosslinking occurs post-polymerization using Friedel-Crafts chemistry in the presence of compounds having chloromethyl groups or chloromethylether groups such as, for example, xylylene-dichloride (XDC), 1,4-bis-chloromethyldiphenyl (CMDP), monochlorodimethylether (MCDE), tris-(chloromethyl)-mesitylene (CMM), and p,p'-bis-chloromethyl-1,4-diphenylbutane (DPB). In still other embodiments, the precursor polymeric material can be crosslinked using predominately Friedel-Crafts chemistry by reacting with a linear polymer such as polystyrene.

The crosslinking of linear polymers such as polystyrene using Friedel-Crafts chemistry is described, for example, in the reference V. A. Davankov et al., *Reactive Polymers,* 13, 27-42 (1990). A small molecule crosslinker having chloromethyl or chloromethyl ether groups is added. This reference also describes the post-crosslinking of gel-type polymers (e.g., lightly crosslinked polymers such as polystyrene crosslinked with low amounts of divinylbenzene such as about 1 weight percent) using Friedel-Crafts chemistry.

Alternatively, gel-type polymers can be prepared from a monomer mixture of styrene and vinyl benzyl chloride (VBC) that is crosslinked with low amounts of divinylbenzene such as 2 weight percent or less. The gel-type polymers can be crosslinked using Friedel-Crafts chemistry but no small molecule crosslinker having chloromethyl or chloromethyl ether groups is required. Rather, the chloromethyl group of VBC serves as the crosslinking point. That is, the crosslinker is already part of the gel-type polymer. This method is further described in the reference Jou-Hyeon Ahn et al., *Macromolecules,* 627-632 (2006).

Macroporous precursor polymers can be prepared from a mixture of styrene and divinylbenzene (DVB) by suspension, emulsion, or precipitation polymerization methods. In precipitation polymerization processes, styrene and DVB monomer mixtures are polymerized in the presence of various solvents that serve as porogens. This can also be accomplished using an emulsion or suspension polymerization method where the organic phase consists of the monomers and the porogen. With precipitation polymerization processes, the reaction product is a monolith that matches the size and shape of the container used for the polymerization reaction. With the emulsion or suspension processes, however, the final polymeric material is typically in the form of beads (particles). The porosity of the resulting polymeric material can be controlled by selection of the amount and identity of the porogen used, the solids content of the polymerization mixture (organic phase), and the amount of crosslinker (e.g., DVB) that is used. These polymerization methods are further discussed in references such as the following: M. M. Mohamed et al., *Nanomaterials,* 2, 163-186 (2012); Y. Zhang et al., *Nano Today,* 4, 135-142 (2009); S. Wei et al., *Colloids and Surfaces A: Physiochem. Eng. Aspects,* 414, 327-332 (2012); A. K. Nyhus et al., *J. Poly. Sci. Part A: Polymer Chemistry,* 37, 3973-3990 (1999); Q. Liu et al., *J. Phys. Chem. C,* 112, 13171-13174 (2008); U.S. Pat. No. 3,531,463 (Gustafson et al.), and U.S. Pat. No. 6,416,487 B1 (Braverman et al.).

Other macroporous precursor polymeric materials can be formed using suspension or emulsion polymerization methods like those described above but with lower levels of the divinylbenzene crosslinker (e.g., 2 to 20 weight percent). A portion of the styrene monomers is replaced with vinyl benzyl chloride (VBC). The resulting polymers can be further crosslinked using Friedel-Crafts chemistry. This method is further described in the reference Jou-Hyeon Ahn et al, *Macromolecules,* 627-632 (2006).

Still other precursor polymeric materials can be prepared as discussed in the reference C. D. Wood et al., *Chem. Mater.,* 19, 2034-2048 (2007). In this instance, bis(chloromethyl) aromatic monomers such as p-xylylene-dichloride (XDC) or isomers thereof, 4,4'-bis(chloromethyl)-1,1'-biphenyl, and bis(chloromethyl) anthracene are reacted alone or in combination using Friedel-Crafts chemistry to produce micro-, meso- and macroporous precursor polymeric materials.

Alternatively, precursor polymeric materials can be prepared using even simpler aromatic compounds such as benzene and crosslinking the benzene using Friedel-Crafts chemistry and a small molecule crosslinker such as formaldehyde dimethyl acetal as described in B. Li et al., *Macromolecules,* 44, 2410-2414 (2011).

In some preferred embodiments, the precursor polymeric material is formed from a polymerizable composition that contains 10 to 80 weight percent divinyl benzene and 20 to 90 weight percent styrene-type monomers (i.e., styrene and/or styrene substituted with an alkyl group) based on the total weight of monomers in the polymerizable composition. In many such embodiments, at least 90 weight percent, at least 92 weight percent, at least 95 weight percent, at least 96 weight percent, at least 98 weight percent, at least 99 weight percent, and up to 100 weight percent of the monomers in the polymerizable composition are selected from divinyl benzene or a styrene-type monomer.

In some embodiments, the amount of divinyl benzene is at least 10 weight percent, at least 20 weight percent, at least 30 weight percent, at least 40 weight percent, at least 50 weight percent, at least 60 weight percent and up to 80 weight percent, up to 70 weight percent, up to 60 weight percent, up to 50 weight percent, or up to 40 weight percent based on the total weight of monomers in the polymerizable composition. The remainder of the monomers is often a styrene-type monomer.

The precursor polymeric material is typically porous and often has a BET specific surface area that is in a range of 25 to 1300 $m^2$/gram. The BET specific surface area is often at least 25 $m^2$/gram, at least 50 $m^2$/gram, at least 100 $m^2$/gram, at least 200 $m^2$/gram, at least 300 $m^2$/gram, at least 400 $m^2$/gram, or at least 500 $m^2$/gram and up to 1300 $m^2$/gram, up to 1200 $m^2$/gram, up to 1100 $m^2$/gram, up to 1000 $m^2$/gram, up to 900 $m^2$/gram, up to 800 $m^2$/gram, up to 700 $m^2$/gram, up to 600 $m^2$/gram, or up to 500 $m^2$/gram. In some embodiments, BET specific surface area is in a range of 100 to 1000 $m^2$/gram or in a range of 200 to 1000 $m^2$/gram.

The precursor polymeric material is treated with a sulfonic acid agent to form a sulfonic acid-containing polymeric material having sulfonic acid groups ($—SO_2OH$). The sulfonic acid group typically replaces a hydrogen atom that is bonded to a carbon atom that is part of an aromatic ring of the precursor polymer. Any known method can be used to introduce the sulfonic acid group into the precursor polymeric material.

In some embodiments, the precursor polymeric material is reacted with a halogenated sulfonic acid (e.g., chlorosulfonic acid) as the sulfonic acid agent. The precursor polymeric material is mixed with a solution of the halogenated sulfonic acid dissolved in an appropriate organic solvent. Suitable organic solvents include various halogenated solvents such as 1,2-dichloroethane, methylene chloride, and chloroform. The precursor polymeric material is often added to the solution of the halogenated sulfonic acid at a temperature below room temperature such as, for example, at about 0° C. The initial reaction can be quite exothermic so, if adequate care is not taken, the solvent can boil during the addition. After the reactants are combined, the temperature is often increased to any desired temperature such as room temperature up to the temperature associated with reflux conditions.

The reaction time can range from a few minutes to 24 hours. After this reaction, the resulting intermediate polymeric material has attached —$SO_2X$ groups where X is halo such as chloro. The reaction time and the reaction temperature can be varied to prepare polymeric materials with different amounts of the sulfonyl-containing group. To prepare the sulfonic acid group (—$SO_2OH$ or —$SO_3H$), the intermediate polymeric material with attached —$SO_2X$ group is placed in water. The conversion of the —$SO_2X$ groups to —$SO_2OH$ groups often can occur at room temperature within 30 minutes, within 1 hour, within 2 hours, within 4 hours, within 8 hours, within 12 hours, within 24 hours, within 36 hours, within 48 hours, within 60 hours, or within 72 hours.

In other embodiments, the precursor polymeric material is reacted with concentrated sulfuric acid or with concentrated sulfuric acid in the presence of a catalyst such as silver sulfate. When a catalyst is present, the reaction typically proceeds faster. With or without the catalyst, the reaction temperature is often in a range of room temperature (e.g., 20-25° C.) to 150° C., in a range of room temperature to 125° C., or in a range of room temperature to 100° C. The reaction times can vary from a few minutes (e.g., 5 minutes, 10 minutes, or 30 minutes) to 24 hours or longer. As with halogenated sulfonic acid, the reaction time and the reaction temperature can be varied to prepare polymeric materials with different amounts of the sulfonic acid group. After this reaction, the resulting polymeric material has attached —$SO_2OH$ groups and is referred to as sulfonic acid-containing polymeric material.

The sulfonic acid-containing polymeric material often contains 0.1 to 5.5 mmoles of sulfonic acid groups per gram based on the total weight of the sulfonic acid-containing polymeric material. For example, the amount of sulfonic acid is at least 0.1 mmoles per gram, at least 0.2 mmoles per gram, at least 0.3 mmoles per gram, at least 0.5 mmoles per gram, at least 1 mmoles per gram, at least 1.5 mmoles per gram, at least 2 mmoles per gram, at least 2.5 mmoles per gram, or at least 3 mmoles per gram and up to 5.5 mmoles per gram, up to 5.0 mmoles per gram, up to 4.5 mmoles per gram, up to 4.0 mmoles per gram, up to 3.5 mmoles per gram, or up to 3 mmoles per gram. In some embodiments, the amount of sulfonic acid in the sulfonic acid-containing polymeric material is in a range of 0.1 to 5.5 mmoles per gram, in a range of 0.5 to 5.5 mmoles per gram, in a range of 1 to 5.5 mmoles per gram, in a range of 1 to 5 mmoles per gram, in a range of 1 to 4.5 mmoles per gram, in a range of 1.5 to 4.5 mmoles per gram, or in a range of 2 to 4.5 mmoles per gram.

The sulfonic acid-containing polymeric material often has a BET specific surface area that is in a range of 25 to 1000 $m^2$/gram. The BET specific surface area is often at least 25 $m^2$/gram, at least 50 $m^2$/gram, at least 100 $m^2$/gram, at least 200 $m^2$/gram, at least 300 $m^2$/gram, at least 400 $m^2$/gram, or at least 500 $m^2$/gram and up to 1000 $m^2$/gram, up to 900 $m^2$/gram, up to 800 $m^2$/gram, up to 700 $m^2$/gram, up to 600 $m^2$/gram, or up to 500 $m^2$/gram. In some embodiments, the BET specific surface area is in a range of 200 to 1000 $m^2$/gram, in a range of 200 to 800 $m^2$/gram, or in a range of 200 to 700 $m^2$/gram.

The sulfonic acid-containing polymeric material is porous. The pores are often in the macroporous region and/or the mesoporous region. The amount of nitrogen gas absorbed by the polymeric sorbent under cryogenic conditions at a relative pressure of 0.98 is used to measure the total pore volume for pores having diameters up to 50 nanometers. This method measures both micropores and mesopores. The pore volume of the sulfonic acid-containing polymeric material at a relative pressure of 0.98 are often at least 0.4 $cm^3$/gram, at least 0.5 $cm^3$/gram, at least 0.6 $cm^3$/gram, at least 0.8 $cm^3$/gram, at least 1.0 $cm^3$/gram, or at least 1.2 $cm^3$/gram. In some embodiments, the sulfonic acid-containing polymeric material is substantially macroporous and has quite low microporosity and mesoporosity.

The sulfonic acid groups are needed to serve as a catalyst for reaction of a sorbed aldehyde with the impregnated urea-based compound. In conventional impregnated sorbents (e.g., impregnated activated carbon) used to sorb aldehydes such as formaldehyde, the urea-based compound is typically accompanied by a strong acid, such as phosphoric acid, to provide a catalyst for the reaction between the urea-based compound and formaldehyde. The acid takes up space within the pores of the sorbent, however, leaving less room for the urea-based compound and formaldehyde. One benefit achieved by using the sulfonic acid-containing polymeric material is that there is no need to separately include an acid with the impregnant (i.e., the urea-based compound). That is, the sulfonic acid-containing polymeric material has the acidic groups already present and the acidic groups are covalently attached.

The urea-based compound is a compound having a group —NH—(CO)—NH—. The urea-based compound can have a linear structure or cyclic structure. The urea-based compound usually has a molecular weight no greater than 300 gram/mole, no greater than 250 grams/mole, or no greater than 200 grams/mole. This compound is often water soluble.

In urea-based compounds having a linear structure, one or two of the hydrogen atoms of urea are replaced with an alkyl, aryl (e.g., phenyl), or acyl group. Examples of linear urea compounds include methylurea, ethylurea, dimethylurea, diethylurea, acetylurea, acetylmethylurea, phenylurea, and diphenylurea.

For cyclic urea-based compounds, the —NH—(CO)—NH— group is on a five or six-membered ring that can be saturated or unsaturated. The five or six-membered ring containing the —NH—(CO)—NH— group can be optionally fused to a second ring having five or six ring members. The five or six-membered ring containing the —NH—(CO)—NH— group can include other heteroatoms such as nitrogen or oxygen and often has a second carbonyl group. The optional fused ring can be saturated or unsaturated and can include one or more heteroatoms such as nitrogen or oxygen. Examples of suitable cyclic ureas include ethyleneurea (i.e., 2-imidazolidone), hydantoin, allantoin, alloxanic acid, oxazolylurea (i.e., parabanic acid), 5,5-dimethylhydantoin, urazole, malonylurea (i.e., barbituric acid), mesoxalylurea (i.e., alloxan), hydroxymalonylurea (i.e., dialuric acid), uramil (i.e., aminobarbituric acid), dilituric acid (i.e., nitrobarbituric acid), violuric acid (i.e., isonitrosobarbituric acid), pseudouric acid (i.e., ureidobarbituric acid), uracil (i.e., 2,4-dihydroxypyrimidine), thymine (i.e., 5-methyluracil), isocyanuric acid, uric acid (i.e., 2,6,8-trihydroxypurine), alloxanthine, and combinations thereof. In one embodiment the urea-based compound includes or is ethyleneurea.

The urea-based compound may be selected so that the compound has more than one active site capable of reacting with the aldehyde. For example, in ethylene urea, both urea nitrogens can react such that two aldehyde molecules per one molecule of ethylene urea can be captured. Further, due to their very low volatility, urea-based compounds do not significantly volatilize and leach out of the sorbent over time. Their high solubility in aqueous solvents (e.g., water and mixtures of water and another solvent, such as ethanol) makes urea-based compounds easy to impregnate at high concentrations.

The amount of urea-based compound impacts the capacity and kinetics of the polymeric sorbent. More urea-based compound often translates to an increased capacity to bind aldehydes. However, too much urea-based compound could fill and essentially block the pores of the polymeric sorbent slowing down the kinetics of aldehyde capture. In some cases, a tradeoff may be seen between the kinetics of capture and overall capacity, where the kinetics of capture may be higher when slightly less of the urea-based compound is used, and overall capacity may be higher when slightly more of the urea-based compound is used.

The polymeric sorbent may include any suitable amount of the urea-based compound impregnated into the sulfonic acid-containing polymeric material. For example, the polymeric sorbent may include at least 1 weight percent, at least 2 weight percent, at least 3 weight percent, at least 5 weight percent, at least 8 weight percent, at least 10 weight percent, or at least 12 weight percent of the urea-based compound based on the total weight of the polymeric sorbent. The polymeric sorbent may include up to 80 weight percent, up to 70 weight percent, up to 60 weight percent, up to 50 weight percent, up to 40 weight percent, up to 30 weight percent, or up to 20 weight percent of the urea-based compound based on the total weight of the polymeric sorbent. For example, the polymeric sorbent may include 1 to 80 weight percent, 1 to 60 weight percent, 10 to 80 weight percent, 10 to 60 weight percent, 10 to 50 weight percent, 20 to 60 weight percent, 1 to 50 weight percent, 10 to 50 weight percent, 20 to 50 weight percent, 1 to 40 weight percent, 10 to 40 weight percent, or 20 to 40 weight percent of the urea-based compound.

In some embodiments, the polymeric sorbent includes at least 0.2 millimole (mmol) of the urea-based compound per gram of polymeric sorbent, at least 0.3 mmol/gram, at least 0.4 mmol/gram, at least 0.5 mmol/gram, at least 0.7 mmol/gram, at least 1.0 mmol/gram, at least 1.5 mmol/gram, or at least 2.0 mmol/gram. The polymeric sorbent may include up to 8 mmol of the urea-based compound per gram of polymeric sorbent, up to 6 mmol/gram, up to 5.5 mmol/gram, up to 5 mmol/gram, up to 4 mmol/gram, up to 3.5 mmol/gram, up to 3 mmol/gram, or up to 2.5 mmol/gram.

When the polymeric sorbent containing the impregnated urea-based compound is exposed to an aldehyde of Formula (I), which is $R^1$—(CO)—H, a reaction can occur between the impregnated urea-based compound and the aldehyde. For example, the reaction of the aldehyde of Formula (I) with ethylene urea is shown below.

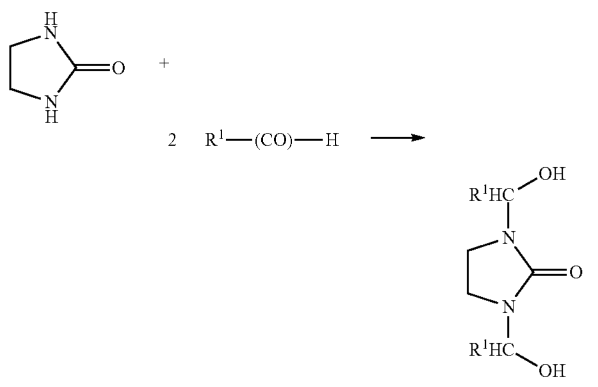

Based on the reaction of an aldehyde of Formula (I) with the impregnated urea-based compound, a method of sorbing an aldehyde is provided. The method includes providing a polymeric sorbent and sorbing the aldehyde on the polymeric sorbent, the aldehyde being of Formula (I)

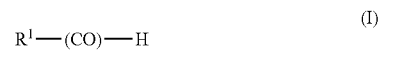

(I)

wherein $R^1$ is hydrogen, alkyl, vinyl, or aryl and wherein the molecular weight of the aldehyde is no greater than 200 grams/mole. Further, a composition is provided that results from the sorption of an aldehyde of Formula (I) on the polymeric sorbent. The composition includes the polymeric sorbent with the aldehyde sorbed on the polymeric sorbent. As shown above, the aldehyde reacts with the urea-based compound. Often, two moles of aldehyde can react with each mole of urea-based compound present in the polymeric sorbent.

In at least some embodiments, the polymeric sorbent has an aldehyde capacity of at least 0.25 millimole (mmol) per gram of polymeric sorbent, at least 0.5 mmol/gram, at least 0.6 mmol/gram, at least 0.75 mmol/gram, or at least 1 mmol/gram. There is no desired upper limit for the aldehyde capacity of the sorbent. In practice, capacities of up to 12 mmol/gram are possible.

In some embodiments, the polymeric sorbent has a formaldehyde or acetaldehyde capacity of at least 0.25 millimole (mmol) of formaldehyde per gram of polymeric sorbent, at least 0.5 mmol/g, at least 0.6 mmol/g, at least 0.75 mmol/g, or at least 1 mmol/g. There is no desired upper limit for the formaldehyde capacity of the polymeric sorbent. In practice, capacities of up to 12 mmol/g are possible.

The polymeric sorbent can be used in a filter. Thus, a filter is provided that includes the polymeric sorbents described above. In many embodiments, the filters are air filters that can remove aldehyde compounds of Formula (I) such as formaldehyde from air.

FIG. 1 shows an exemplary air filter 1 that includes at least one filter support 10. A filter support 10 can be any structure that supports polymeric sorbent particles 100 in such a manner that exposes them to air, while retaining the polymeric sorbent particles so that, if the air is moving, the polymeric sorbent particles are not dislodged by the moving air. For example, the filter support 10 may include an adhesive to adhere the polymeric sorbent particles 100 to the filter support 10. If the air is moving, it may encounter individual polymeric sorbent particles or a collection of polymeric sorbent particles while in laminar flow or while in turbulent flow, or the air may transition between flow regimes. In some embodiments, the filter support 10 may take the form of a substrate on which polymeric sorbent particles 100 are provided (e.g., are attached to a major surface thereof) and across which a moving stream of air may traverse. In some embodiments the filter support 10 may retain polymeric sorbent particles 100 by way of the polymeric sorbent particles being attached (e.g., adhesively bonded) to the filter support 10.

Figure 2:
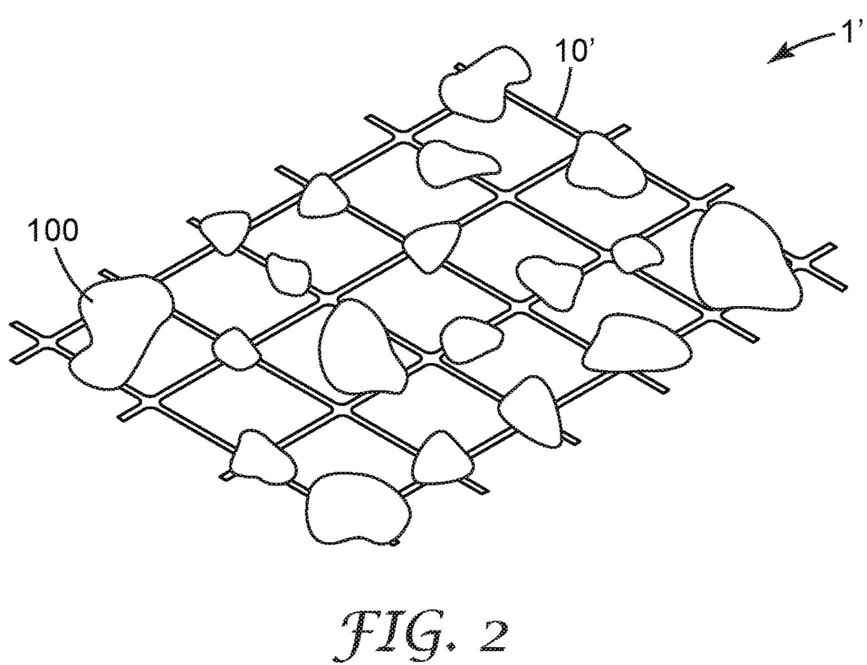
FIG. 2 is a schematic view of a portion of another exemplary air filter according to an embodiment.

In an alternative embodiment of an air filter 1', a filter support 10' may retain polymeric sorbent particles 100 by mechanically retaining the polymeric sorbent particles within the filter support 10', as schematically shown in FIG. 2. In the embodiment shown, the polymeric sorbent particles 100 may not necessarily be attached to the filter support 10', but the filter support 10' can physically block the polymeric sorbent particles from being dislodged and removed from the filter support 10'. In some embodiments, a combination of mechanical retention and attachment (e.g., bonding) of polymeric sorbent particles to the filter support 10' may be employed.

In some embodiments, the air filter 1, 1' includes a filter support 10, 10' and sorbent particles 100. In some embodiments, the air filter 1 also includes other layers as desired for any purpose, and/or may additionally include any other ancillary components, such as a frame, one or more reinforcing or stabilizing members, one or more housing pieces, or the like.

As noted with reference to FIG. 1, in some embodiments the filter support may take the form of a substrate (which substrate may be air impermeable or air permeable) with polymeric sorbent particles 100 disposed (e.g., adhered) on a major surface of the substrate. Air filters of this type may include, for example, a planar or pleated substrate bearing polymeric sorbent particles attached to a major surface thereof, a hollow tube with polymeric sorbent particles attached to an interior surface thereof, or an array of flow-through channels provided by stacked or nested microstructured substrates (e.g., of the general type described in U.S. Pat. No. 7,955,570 (Insley et al.)) with sorbent particles attached to interior surfaces of the flow-through channels, and the like. In some embodiments, the polymeric sorbent particles 100 may be provided at least substantially as a monolayer on a surface of the substrate (e.g., as shown in FIG. 1), except for such occasional stacking as may occur statistically in any industrial-scale deposition process. In other embodiments, the polymeric sorbent particles may be present in multiple layers, where at least some of the layers may be adhesively bonded onto a surface of the substrate or an underlying layer. In yet other embodiments, the polymeric sorbent particles may be distributed on a major surface of the substrate, distributed throughout the substrate, or both.

Any suitable filter support may be used, such as a woven or non-woven substrate. The woven or non-woven substrate may be made of any suitable material such as, for example, wool, steel wool, silk, glass fibers, cellulosic fibers (e.g., crepe paper, Kraft paper, cotton, linen, viscose, or rayon), synthetic fibers (e.g., nylon, rayon, polyester, polyethylene, polypropylene, polyvinyl alcohol, acrylic, acetate, polyamide, or carbon fiber), and combinations thereof. Suitable filter supports can support the polymeric sorbent on or in the substrate, and allow for gases (e.g., air) to contact the sorbent.

An adhesive may optionally be added to the filter support to adhere (e.g., to adhesively bond) the polymeric sorbent particles to the filter support. This may be done, for example, by coating an adhesive or an adhesive precursor onto the filter support, optionally converting the adhesive precursor to an adhesive, and then depositing polymeric sorbent particles. In some embodiments, polymeric sorbent particles may be applied on the filter support in a monolayer. In other embodiments, the polymeric sorbent particles may be applied at least in part in multiple layers (made, for example, by adhesively bonding a first layer of sorbent particles onto the filter support, applying additional adhesive onto the first layer, and depositing more polymeric sorbent particles, etc.). Examples of suitable adhesives include pressure-sensitive adhesives, hot-melt adhesives, epoxy adhesives, and the like. Commercially available examples of suitable adhesives include products available under the trade designation ACRONAL from BASF Corp. (Charlotte, NC), products available under the trade designations SUPER 77 MULTI-PURPOSE SPRAY ADHESIVE and HI STRENGTH 90 SPRAY ADHESIVE from 3M Company (St. Paul, MN), a product available under the trade designation DEVCON 5 MINUTE EPOXY from ITW (Danvers, MA), and products available under the trade designation GORILLA GLUE from Gorilla Glue, Inc. (Cincinnati, OH).

The polymeric sorbent may be applied to the filter support in any suitable manner. For example, the sorbent may be applied as a powder by blowing or sprinkling, or as a liquid dispersion by spraying, immersion, or the like. The filter support may include an adhesive to adhere polymeric sorbent particles to the substrate.

One possible benefit from using the polymeric sorbent of the present disclosure on an air filter is that the polymeric sorbent usually has a light color. Therefore, when used on a white or light-colored filter support, the polymeric sorbent does not visually stand out as opposed to, for example, activated carbon, which appear to be black dust or particles against a white or light-colored filter support and can make even a new filter appear dirty or used.

The air filter may optionally include filter media and/or other additives or sorbent materials (in addition to the polymeric sorbents), such as activated alumina, silica gel, zeolite, kaolin, adsorbent clay, activated bauxite, activated carbon, and combinations thereof.

The air filter may include any suitable amount of the polymeric sorbent. In some embodiments, where the air filter includes a planar or pleated filter support with sorbent, the air filter includes at least 100 grams of the sorbent per square meter of filter support (grams/$m^2$), at least 150 grams/$m^2$, or at least 250 grams/$m^2$ of the sorbent. The air filter may include up to 1000 grams/$m^2$, up to 750 grams/$m^2$, or up to 500 grams/$m^2$ of the sorbent.

The air filter including the polymeric sorbent has a high efficiency for removing aldehydes, such as formaldehyde, from air. Preferably the aldehyde-removing efficiency of the air filter is comparable or better than conventional air filters, such as those including impregnated activated carbon. In some embodiments, the air filter has an improved initial efficiency. The initial efficiency may be measured as the proportion of aldehyde removed from air during the first 5 minutes of filtration at a concentration of 10 ppm aldehyde and 50 percent relative humidity (for further details see Filter Efficiency and Capacity Test in the Examples). According to some embodiments, the air filter has an initial efficiency of 30 percent or greater, 40 percent or greater, 50 percent or greater, or 60 percent or greater for removing aldehyde from air.

The air filter may be used in any suitable manner for removing aldehydes from air. For example, the air filter including a filter support and a polymeric sorbent may be positioned so that the sorbent is exposed to the air. Air movement to the sorbent and/or across or through the filter may be passive or active (e.g., assisted by a pump or fan).

Some of the air filters are part of an air purifier such as a room air purifier or an air purifier positioned within a motorized vehicle near the driver and passengers. Other air filters are part of a respirator such as a personal respiratory protection device.

Various embodiments are provided that include a polymeric sorbent, a method of making the polymeric sorbent, a method of sorbing an aldehyde on the polymeric sorbent, a composition containing a polymeric sorbent and an aldehyde sorbed on the polymeric sorbent, and a filter containing the polymeric sorbent.

Embodiment 1A is a polymeric sorbent. The polymeric sorbent includes a sulfonic acid-containing polymeric material that is impregnated with a urea-based compound. The sulfonic acid-containing polymeric material has covalently attached sulfonic acid groups and is the reaction product of a mixture containing 1) a precursor polymeric material comprising a polymerized product of a polymerizable composition that contains aromatic monomers and 2) a sulfonic acid agent.

Embodiment 2A is the polymeric sorbent of embodiment 1A, wherein the polymerizable composition used to form the precursor polymeric material comprises i) 10 to 80 weight percent divinyl benzene based on a total weight of monomers in the polymerizable composition and ii) 20 to 90 weight percent styrene-type monomers based on the total weight of monomers in the polymerizable composition.

Embodiment 3A is the polymeric sorbent of embodiment 1A or 2A, wherein the sulfonic acid-containing polymeric material comprises 0.1 to 5.5 mmoles sulfonic acid groups per gram.

Embodiment 4A is the polymeric sorbent of any one of embodiments 1A to 3A, wherein the sulfonic acid-containing polymeric material contains 2 to 4.5 mmoles of sulfonic acid groups per gram.

Embodiment 5A is the polymeric sorbent of any one of embodiments 1A to 4A, wherein the sulfonic acid-containing polymeric material often has a BET specific surface area that is in a range of 25 to 1000 $m^2$/gram.

Embodiment 6A is the polymeric sorbent of any one of embodiments 1A to 5A, wherein the sulfonic acid-containing polymeric material has a BET surface area in a range of 200 $m^2$/gram to 1000 $m^2$/gram.

Embodiment 7A is the polymeric sorbent of any one of embodiments 1A to 6A, wherein the sulfonic acid-containing polymeric material has a BET specific surface area that is in a range of 200 to 700 $m^2$/gram.

Embodiment 8A is the polymeric sorbent of any one of embodiments 1A to 7A, wherein the sulfonic acid-containing polymeric material has a pore volume at a relative pressure of 0.98 equal to at least 0.4 $cm^3$/gram.

Embodiment 9A is the polymeric sorbent of any one of any one of embodiments 1A to 8A, wherein polymeric sorbent comprises 1 to 80 weight percent of urea-based compound based on a total weight of the porous polymeric material.

Embodiment 10A is the polymeric sorbent of any one of embodiments 1A to 9A, wherein the polymeric sorbent contains 1 to 60 weight percent urea-based compound based on a total weight of the polymeric sorbent.

Embodiment 11A is the polymeric sorbent of any one of embodiments 1A to 10A, wherein the polymeric sorbent contains 10 to 60 weight percent urea-based compound based on a total weight of the polymeric sorbent.

Embodiment 12A is the polymeric sorbent of any one of embodiments 1A to 11A, wherein the polymeric sorbent contains 0.2 to 8 mmoles of urea-based compound per gram of the polymeric sorbent.

Embodiment 13A is the polymeric sorbent of any one of embodiments 1A to 12A, wherein the polymeric sorbent contains 0.2 to 6 mmoles of urea-based compound per gram of the polymeric sorbent.

Embodiment 14A is the polymeric sorbent of any one of embodiments 1A to 13A, wherein the polymeric sorbent contains 1 to 6 mmoles of urea-based compound per gram of the polymeric sorbent.

Embodiment 15A is the polymeric sorbent of any one of embodiments 1A to 14A, wherein the polymeric sorbent contains mesopores having a diameter in a range of 2 to 50 nanometers and/or macropores having a diameter equal to 50 nanometers or greater.

Embodiment 16A is the polymeric sorbent of any one of embodiments 1A to 14A, wherein the polymeric sorbent has an aldehyde sorption capacity in a range of 0.25 to 12 mmoles per gram.

Embodiment 1B is a method of making a polymeric sorbent. The method includes obtaining a sulfonic acid-containing polymeric material having covalently attached sulfonic acid groups. The sulfonic acid-containing polymeric material includes a reaction product of a mixture that contains 1) a precursor polymeric material comprising a polymerized product of a polymerizable composition comprising aromatic monomers and 2) a sulfonic acid agent. The method further includes impregnating the sulfonic acid-containing polymeric material with a urea-based compound to form the polymeric sorbent.

Embodiment 2B is the method of making a polymeric sorbent wherein the polymeric sorbent is any one of embodiments 2A to 16A.

Embodiment 1C is a method of sorbing an aldehyde. The method includes providing a polymeric sorbent as described in any one of embodiments 1A to 16A and sorbing the aldehyde on the polymeric sorbent, the aldehyde being of Formula (I)

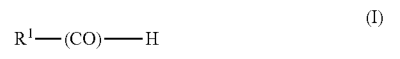 (I)

wherein $R^1$ is hydrogen, alkyl, vinyl, or aryl and wherein the molecular weight of the aldehyde is no greater than 200 grams/mole.

Embodiment 2C is the method of embodiment 1C, wherein the $R^1$ is hydrogen or methyl. Embodiment 1D is a composition that includes the polymeric sorbent described in any one of embodiments 1A to 16A and an aldehyde sorbed on the polymeric sorbent. The aldehyde is of Formula (I)

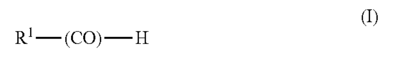 (I)

wherein $R^1$ is hydrogen, alkyl, vinyl, or aryl and wherein the molecular weight of the aldehyde is no greater than 200 grams/mole.

Embodiment 2D is the composition of embodiment 1D, wherein the $R^1$ is hydrogen or methyl.

Embodiment 1E is a filter comprising a polymeric sorbent of any one of embodiments 1A to 16A.

Embodiment 2E is a filter of embodiment 1E, wherein the filter is an air purifier or respirator.

Embodiment 3E is a filter of embodiment 1E or 2E, wherein the polymeric sorbent captures an aldehyde of Formula (I)

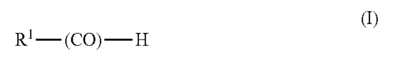 (I)

wherein $R^1$ is hydrogen, alkyl, vinyl, or aryl and wherein the molecular weight of the aldehyde is no greater than 200 grams/mole.

Embodiment 4E is a filter of any one of embodiments 1E to 3E, wherein the filter further comprises a filter support comprising a substrate.

Embodiment 5E is a filter of embodiment 4E, wherein the polymeric sorbent is distributed on a major surface of the substrate, distributed throughout the substrate, or a combination thereof.

EXAMPLES

Materials

The materials with their sources are listed in TABLE 1. Unless otherwise indicated, all materials were purchased from commercial sources and used as received.

TABLE 1

List of materials.

| Chemical Name | Chemical Supplier |
|---|---|
| Styrene-Divinylbenzene (St/DVB) Copolymer (XAD-2) (20 x 60 mesh particles) | Supelco, Bellefonte, PA |
| St/DVB Copolymer (XAD-16) (20 × 60 mesh particles) | Alfa Aesar, Ward Hill, MA |
| St/DVB Copolymer (XAD-1180) (20 × 60 mesh particles) | Alfa Aesar |
| Paraformaldehyde | Sigma-Aldrich, St. Louis, MO |
| Sulfuric Acid, (18M) ($H_2SO_4$) | EMD Millipore Chemicals, Billerica, MA |
| Silver Sulfate ($Ag_2SO_4$) | Alfa Aesar |
| Methanol (MeOH) | EMD Millipore Chemicals |
| Chlorosulfonic acid | Alfa Aesar |
| 1,2-Dichloroethane (DCE) | EMD Millipore Chemicals |
| Sodium Carbonate ($Na_2CO_3$) | VWR International LLC, Radnor, PA |
| Dichloromethane ($CH_2Cl_2$) | EMD Millipore Chemicals |
| Potassium Carbonate ($K_2CO_3$) | VWR International LLC |
| 2-Imidazolidinone hemihydrate (ethylene urea, EU) | Alfa Aesar |

Test Methods

Gas Sorption Analysis

Porosity and gas adsorption experiments were performed using a Micromeritics Instrument Corporation (Norcross, GA) accelerated surface area and porosimetry (ASAP) 2020 system using adsorbates of ultra-high purity. The following is a typical method used for the characterization of the porosity within the exemplified materials. In a Micromeritics half inch diameter sample tube, 50-250 milligrams of material were degassed by heating under ultra-high vacuum (3-7 micrometers Hg) to remove residual solvent and other adsorbates. The degas procedure for the precursor polymeric materials (XAD-2, XAD-16 and XAD-1180) was 3 hours at 150° C. on the degas port followed by 3 hours at 150° C. on the analysis port. The degas procedure for the sulfonic acid-containing polymeric materials was 3 hours at 120° C. on the degas port followed by 3 hours at 120° C. on the analysis port. The nitrogen adsorption isotherm at 77 K for both the precursor polymeric materials and the sulfonic acid-containing polymeric materials was obtained using low pressure dosing (5 centimeters cubed per gram ($cm^3/g$)) at a relative pressure ($p/p^\circ$) less than 0.1 and a pressure table of linearly spaced pressure points from a $p/p^\circ$ in a range from 0.1 to 0.98. The method for the isotherm made use of the following equilibrium intervals: 90 seconds at $p/p^\circ$ less than $10^{-5}$, 40 seconds at $p/p^\circ$ in a range of $10^{-5}$ to 0.1, and 20 seconds at $p/p^\circ$ greater than 0.1. Helium was used for the free space determination, after nitrogen adsorption analysis, both at ambient temperature and at 77 K. BET specific surface areas ($SA_{BET}$) were calculated from nitrogen adsorption data by multipoint Brunauer-Emmett-Teller (BET) analysis. Apparent micropore distributions were calculated from nitrogen adsorption data by density functional theory (DFT) analysis using the standard nitrogen at 77 K DFT model. Apparent mesopores and/or macropore distributions were calculated from nitrogen adsorption data by Barrett-Joyner-Halenda (BJH) analysis. Total pore volume was calculated from the total amount of nitrogen adsorbed at a $p/p^\circ$ equal to 0.98. BET, DFT, BJH and total pore volume analyses were performed using Micromeritics MicroActive Version 5.00.03 software.

Filter Efficiency and Capacity Test

The filter efficiency and capacity test can be used to determine the efficiency of a filter to capture an aldehyde (e.g., formaldehyde) and the aldehyde (e.g., formaldehyde) capacity of the filter. Porous polymeric material (sorbent) particles on a netting support with a specified surface area were exposed to air with a known amount of formaldehyde, and the amount of formaldehyde removed from the air was measured.

The filter efficiency and capacity test was performed on the filter samples against a challenge of 10 parts per million (ppm, by volume) formaldehyde at 50 percent relative humidity (RH) and a 24.3 liter per minute (LPM) air flow. The filter samples were 3-inch (7.62 cm, 0.00762 m) in diameter circles with the exposed area only being a 1.75-inch (4.45 cm, 0.0445 m) diameter circular region of it.

Formaldehyde was generated by heating a paraformaldehyde solution in a 50 percent relative humidity air stream. A simple flow-through custom built delivery system was used to deliver a known concentration of formaldehyde to a sample for measurement. Plastic tubing was used throughout the delivery system, with portions downstream of the formaldehyde generation being fluoropolymer tubing.

Formaldehyde was generated by delivering a 0.94 weight percent solution of paraformaldehyde in water using a 25 milliliter (mL) ILS syringe (from Innovative Labor Systeme, Inc., Stutzerbach, Germany). The syringe was driven at a specific rate by a syringe pump (model MA1 55-2222 from Harvard Apparatus, Holliston, MA). By knowing the paraformaldehyde concentration in solution and the cross-sectional area of the syringe, a precise rate of paraformaldehyde solution could be delivered. The solution was delivered onto a piece of filter paper resting on hot gold foil in a flask which served to decompose the paraformaldehyde and vaporize the resulting formaldehyde. Through the flask, a humidified stream of house compressed air was passed, controlled by a mass flow controller (model P5A-29277 from MKS Instruments, Andover, MA). The air was set to 50 percent relative humidity by a flask containing heated water and a proportional integral derivative (PID) controller (from 3M Company, Maplewood, MN). The PID controller adjusted the heat to the water flask in accordance to the target RH. At the start of each test, the mass flow controller was set to deliver a flow rate of 24.3 LPM, calibrated by a flow meter (model 4040 from TSI, Inc., Shoreview, MN). The evaporation of the formaldehyde served to create a concentration of 10 ppm formaldehyde in the air. It is possible to generate higher and lower formaldehyde concentrations by altering the concentration of the paraformaldehyde solution or adjusting the rate of solution delivery.

The filter sample (see Filter Preparation Procedure below) was placed in a sample holder. The sample holder with the filter sample was placed in a chamber, where the formaldehyde gas stream was passed through the sample. Downstream of the testing chamber, the tubing was connected to an Innova 1412i photoacoustic detector from California Analytical Instruments (Orange, CA) which sampled the effluent from the test chamber. The detector was calibrated by sampling the unfiltered formaldehyde gas stream for 40 minutes before each filter sample was added and again for 30 minutes after the filter sample was removed. The detected concentration was then normalized to 10 ppm formaldehyde. At the time the formaldehyde gas stream began to pass through the filter sample, the test was considered started, and a timer was started. The concentration of formaldehyde in the effluent being sampled was recorded every 75 seconds. The test was considered completed when 95 percent breakthrough of the full formaldehyde concentration was observed.

The initial efficiency and the 95 percent breakthrough capacity were then calculated for each filter sample. The initial efficiency was calculated by averaging the data points of %-reduction in concentration for the first 5 minutes of the test. The 95% breakthrough capacity was calculated by the total mass of formaldehyde that was filtered out of the stream of air until at least 95 percent of the full formaldehyde concentration was detected breaking through the filter sample, being averaged every 30 minutes.

The data collected during this test for each filter sample was used to make a plot of formaldehyde capture efficiency as a function of time. From the formaldehyde capture efficiency plot, a total formaldehyde loading capacity at 95 percent formaldehyde breakthrough was obtained by fitting an exponential curve to the plot using standard fitting methods. The area under the curve was then calculated. The value for the area under the curve was multiplied by the mass flow rate of the formaldehyde and then divided by the sorbent mass on the filter to obtain a mass % uptake of formaldehyde for the sorbent.

A second plot was then made from the first formaldehyde capture efficiency plot with the second plot having the time (x) axis normalized by filter area (per square meter). From this plot, a total formaldehyde loading capacity at 95 percent formaldehyde breakthrough was obtained by fitting an exponential curve to the plot using standard fitting methods. The area under the curve was calculated and then multiplied by the mass flow rate of the formaldehyde to obtain the filter aldehyde capacity (reported in grams of formaldehyde sorbed per square meter of filter area).

Filter Preparation Procedure

A netting was obtained from Delstar Technologies, Inc. (Middleton, DE) under the trade designation DELNET R0412-10PR. The netting was reported to have a basis weight of 60 grams per meter squared ($g/m^2$). The netting comprised two sets of filaments oriented substantially perpendicular to each other to form an array of generally rectangular through-apertures (openings) each with an approximate dimension of 1.7 millimeters (mm)×0.7 mm. A pressure-sensitive adhesive (PSA) precursor (coating solution) was applied to both sides of the netting, and the solvent was dried to leave an acrylic-based PSA on each side of the netting at a basis weight of approximately 30 $g/m^2$ on each side. Particles (20×60 mesh for polymeric sorbents, 30×60 mesh for impregnated carbons) of a given sorbent were manually sprinkled onto both sides of a 3-inch (7.62 cm, 0.0762 m) diameter circle of the netting so that sorbent particles became adhesively attached to the PSA present on the major surfaces of the netting. The total area of the filter sample was 7.07 square inches (45.63 $cm^2$, 0.0046 $m^2$). The mass of the sorbent added was determined by weighing the filter sample before and after loading of the sorbent onto the netting. From this information, grams of sorbent on the filter per square meter of filter ($g/m^2$ in TABLE 4) were calculated. These sorbent-containing filter samples were used in the filter efficiency and capacity test method described above.

Procedure for Determination of Acid Equivalents Per Gram by Liquid Titration

Particles of the sulfonic acid-containing polymeric materials of Preparatory Examples 1-4 (about 0.200 grams) were suspended in 20 milliliter (mL) of deionized water. To this suspension was added 1 drop of a 1 percent by weight aqueous solution of phenolphthalein. This suspension was titrated with 0.1 molar (M) aqueous sodium hydroxide (NaOH) until a persistent pink color remained (phenolphthalein endpoint). The acid equivalents per gram (mmol/g) for each sulfonic acid-containing polymeric material were calculated based on the amount of NaOH needed to reach the titration endpoint.

Preparative Examples

Preparative Examples 1-3 (PE-1 to PE-3)

The following procedure was used for the sulfonation of the precursor polymeric materials XAD-2, XAD-16 and XAD-1180 to make the sulfonic acid-containing polymeric materials (Preparative Examples 1-3 (PE-1 to PE-3), respectively) using silver sulfate ($Ag_2SO_4$). In a 2-liter (L) round bottom flask equipped with a stir bar, 0.8018 grams (g) (2.57 mmol) of $Ag_2SO_4$ was dissolved in 600 mL of concentrated (18.0 M) sulfuric acid. To this solution was added slowly 100.07 g of the precursor polymeric material as received (the as received precursor polymeric materials are approximately 60 weight percent water so the actual amount of precursor polymeric material added was approximately 40 grams). The precursor polymeric material instantly turned a reddish/brown color. The round bottom flask was stoppered and placed in a sand bath. The reaction mixture was stirred at 100° C. overnight.

After reacting at 100° C. for 18 hours, the reaction was stopped by removing the round bottom flask from the sand bath. The reaction mixture was cooled to room temperature. In a 4 L Erlenmeyer flask, 3.0 L of 6 M aqueous (aq.) sulfuric acid was prepared by adding 1.0 L of concentrated (18.0 M) sulfuric acid slowly to 2.0 L of deionized water. The contents of the round bottom flask were slowly poured into the stirred 3.0 L of 6 M aq. sulfuric acid. This mixture was then vacuum filtered to isolate the dark red sulfonic acid-containing polymeric material particles. The particles were washed with 1.0 L of deionized water. The particles were then washed with ultrapure water (approximately 18 M Ohm resistivity) until the pH of the last 100 mL of the wash was neutral. The particles were then washed with 800 mL of methanol (MeOH), and the MeOH was removed by vacuum filtration. The resin particles were placed in a batch oven and dried overnight at 120° C.

The acid equivalents of each sulfonic acid-containing polymeric material (PE-1 to PE-3) was determined using the procedure for determination of acid equivalents per gram by liquid titration described above. The $SA_{BET}$ and total pore volume values for the precursor polymeric materials XAD-2, XAD-16 and XAD-1180 and the sulfonic acid-containing polymeric materials of PE-1 to PE-3 obtained from nitrogen adsorption along with the determined acid equivalents for PE-1 to PE-3 are shown in TABLE 2.

TABLE 2

Porosity characterization of the precursor polymeric materials and the sulfonic acid-containing polymeric materials PE-1 to PE-3 along with measured acid equivalents for PE-1 to PE-3.

| Preparatory Example # | Precursor Polymeric Material | Precursor Polymeric Material Surface Area, $m^2/g$ | Precursor Polymeric Material Total Pore Volume, $cm^3/g$ $(p/p_o)$ | Sulfonic Acid-Containing Polymeric Material Surface Area, $m^2/g$ | Sulfonic Acid-Containing Polymeric Material Total Pore Volume, $cm^3/g$ $(p/p_o)$ | Acid Equivalents, mmol/g |
|---|---|---|---|---|---|---|
| PE-1 | XAD-2 | 379.8 | 0.743 (0.98) | 171.2 | 0.461 (0.98) | 2.41 |
| PE-2 | XAD-16 | 730.2 | 1.473 (0.98) | 735.2 | 1.439 (0.98) | 2.71 |
| PE-3 | XAD-1180 | 526 | 1.083 (0.98) | 522.4 | 1.159 (0.98) | 2.70 |

Preparative Example 4 (PE-4)

The following procedure was used for the sulfonation of the precursor polymeric material XAD-1180 to make the sulfonic acid-containing polymeric material (Preparative Example 4 (PE-4)) using chlorosulfonic acid. In a 1.0 L round bottom flask, 224.38 g (1.926 moles) of chlorosulfonic acid was poured into 260 mL of 1,2-dichloroethane (DCE) while the round bottom flask was cooled in an ice/water bath (0° C.). To this solution was added 50.26 g of dry precursor polymeric material with the round bottom flask still in the ice/water bath. After mixing for a few minutes, the round bottom flask was removed from the ice/water bath and placed in a sand bath at 90° C. The round bottom flask was equipped with a stir bar and reflux condenser. The reaction was kept under a dry nitrogen atmosphere and reacted at this elevated temperature overnight. The outlet for the nitrogen was bubbled through a saturated sodium carbonate ($Na_2CO_3$) solution to remove any acidic gas coming from the reaction.

After reacting at 90° C. overnight, the round bottom flask was removed from the sand bath, and the reaction mixture was cooled to room temperature. The reaction mixture was poured into a column using 600 mL of dichloromethane ($CH_2Cl_2$) to help transfer. An aq. potassium carbonate ($K_2CO_3$) solution was prepared by dissolving 500 g of $K_2CO_3$ in 1000 mL of deionized water. The $K_2CO_3$ solution was in a 2 L flask, and the flask was placed in an ice/water bath. The solvent from the reaction mixture was slowly dripped into the stirred $K_2CO_3$ solution. Once the solvent was removed, ultrapure water (approximately 18 M Ohm resistivity) was added using a pipette until the sulfonic acid-containing polymeric material particles stopped fuming. The particles were then washed with ultrapure water (approximately 18 M Ohm resistivity) until the pH of the last 100 mL of the wash was neutral. The particles were placed in a batch oven and dried overnight at 120° C.

The acid equivalents of the sulfonic acid-containing polymeric material (PE-4) was determined using the procedure for determination of acid equivalents per gram by liquid titration described above. The $SA_{BET}$ and total pore volume values of the precursor polymeric material and the sulfonic acid-containing polymeric material of PE-4 obtained from nitrogen adsorption along with the determined acid equivalents for PE-4 are shown in TABLE 3.

TABLE 3

Porosity characterization of the precursor polymeric material and the sulfonic acid-containing polymeric material PE-4 along with measured acid equivalents for PE-4.

| Preparatory Example # | Precursor Polymeric Material | Precursor Polymeric Material Surface Area, $m^2/g$ | Precursor Polymeric Material Total Pore Volume, $cm^3/g$ $(p/p_o)$ | Sulfonic Acid-Containing-Polymeric Material Surface Area, $m^2/g$ | Sulfonic Acid-Containing Polymeric Material Total Pore Volume, $cm^3/g$ $(p/p_o)$ | Acid Equivalents, mmol/g |
|---|---|---|---|---|---|---|
| PE-4 | XAD-1180 | 526 | 1.083 (0.98) | 366.2 | 1.008 (0.98) | 4.31 |

Examples 1-12 (EX-1 to EX-12)

The polymeric sorbent of Examples 1-12 (EX-1 to EX-12) were prepared using the following procedure. Aqueous 2-imidazolidinone hemihydrate (ethylene urea or EU) solutions were prepared as follows (calculated wt. % based on the mass of 2-imidazolidinone hemihydrate added). A 15 wt. % aqueous EU solution was prepared by dissolving 22.48 g of EU hemihydrate in 127.59 g of deionized water. A 20 wt. % aqueous EU solution was prepared by dissolving 30.05 g of EU hemihydrate in 120.57 g of deionized water. A 25 wt. % aqueous EU solution was prepared by dissolving 37.55 g of EU hemihydrate in 112.76 g of deionized water. The particles of a given sulfonic acid-containing polymeric material were impregnated by taking 5 g of particles and soaking them in 50 g of a given aqueous EU solution in a 4-oz. jar. The particles were soaked in the EU solutions at room temperature for 5 hours. The contents of the jar were periodically stirred by shaking the jar. After soaking for 5 hours, the particles were isolated by vacuum filtration using only minimal water to remove the particles from the jar. The particles were placed in a batch oven and dried overnight at 120° C.

A total of 12 polymeric sorbents (EX-1 to EX-12) were prepared by impregnating each the sulfonic acid-containing polymeric materials PE-1 to PE-4 with 15, 20 or 25 wt. % aqueous EU solutions. These sorbents were used to prepare filter samples according to the filter preparation procedure. The prepared filter samples were subsequently tested using the filter efficiency and capacity test method (TABLE 4).

Comparative Examples

Comparative Examples 1-2 (CE-1 and CE-2)

Comparative Example 1 (CE-1) was an impregnated activated carbon, 30×60 mesh, obtained under the trade designation FORMASORB (FSB) from Calgon Carbon Corporation, Moon Township, PA. This sorbent was used to prepare a filter sample according to the filter preparation procedure. The prepared filter sample was subsequently tested using the filter efficiency and capacity test method (TABLE 4).

Comparative Example 2 (CE-2) was an impregnated activated carbon, 30×60 mesh, obtained under the trade designation CHEMSORB 1505 (C1505) from Molecular Products Limited, Harlow, Essex, UK. This sorbent was used to prepare a filter sample according to the filter preparation procedure. The prepared filter sample was subsequently tested using the filter efficiency and capacity test method (TABLE 4).

TABLE 4

Filter efficiency and capacity test results for porous polymeric materials EX-1 to EX 12 and Comparative Examples CE-1 and CE-2.

| Example | Sulfonic Acid-Containing Polymeric Material | EU Solution Conc., wt. % | Sorbent Loading, $g/m^2$ | Formaldehyde Capacity $g/m^2$ | Formaldehyde Capacity % mass | Initial Efficiency |
|---|---|---|---|---|---|---|
| CE-1 | NA | NA | 275 | 0.6 | 0.2 | 42% |
| CE-2 | NA | NA | 272 | 0.6 | 0.2 | 37% |
| EX-1 | PE-1 | 15 | 368 | 4.4 | 1.2 | 40% |
| EX-2 | PE-1 | 20 | 351 | 6.4 | 1.8 | 43% |
| EX-3 | PE-1 | 25 | 358 | 5.3 | 1.5 | 32% |
| EX-4 | PE-2 | 15 | 340 | 12.6 | 3.7 | 47% |
| EX-5 | PE-2 | 20 | 330 | 14.7 | 4.4 | 50% |
| EX-6 | PE-2 | 25 | 299 | 14.0 | 4.7 | 51% |
| EX-7 | PE-3 | 15 | 276 | 8.7 | 3.2 | 50% |
| EX-8 | PE-3 | 20 | 284 | 11.0 | 3.9 | 50% |
| EX-9 | PE-3 | 25 | 250 | 12.6 | 5.0 | 50% |
| EX-10 | PE-4 | 15 | 339 | 8.2 | 2.4 | 63% |
| EX-11 | PE-4 | 20 | 354 | 8.2 | 2.3 | 56% |
| EX-12 | PE-4 | 25 | 339 | 9.5 | 2.8 | 56% |

What is claimed is:

1. A polymeric sorbent comprising:
   a) a sulfonic acid-containing polymeric material having covalently attached sulfonic acid groups, the sulfonic acid-containing polymeric material comprising a reaction product of a mixture comprising
      1) A precursor polymeric material comprising a polymerized product of a polymerizable composition comprising aromatic monomers; and
      2) A sulfonic acid agent; and
   b) urea-based compounds impregnated into the sulfonic acid-containing polymeric material.

2. The polymeric sorbent of claim 1, wherein the polymerizable composition used to form the precursor polymeric material comprises
   i) 10 to 80 weight percent divinyl benzene based on a total weight of monomers in the polymerizable composition; and
   ii) 20 to 90 weight percent styrene-type monomers based on the total weight of monomers in the polymerizable composition.

3. The polymeric sorbent of claim 1, wherein the sulfonic acid-containing polymeric material comprises 0.1 to 5.5 mmoles sulfonic acid groups per gram.

4. The polymeric sorbent of claim 1, wherein the polymeric sorbent comprises 1 to 80 weight percent of urea-based compound based on a total weight of the porous polymeric material.

5. The polymeric sorbent of claim 1, wherein the sulfonic acid-containing polymeric material has a BET surface area in a range of 25 $m^2$/gram to 1000 $m^2$/gram.

6. The polymeric sorbent of claim 1, wherein the polymeric sorbent contains mesopores having a diameter in a range of 2 to 50 nanometers and macropores having a diameter greater than 50 nanometers.

7. A method of making a polymeric sorbent, the method comprising:
   a) obtaining a sulfonic acid-containing polymeric material having covalently attached sulfonic acid groups, the sulfonic acid-containing polymeric material comprising a reaction product of a mixture comprising
      1) A precursor polymeric material comprising a polymerized product of a polymerizable composition comprising aromatic monomers; and
      2) A sulfonic acid agent; and
   b) impregnating the sulfonic acid-containing polymeric material with a urea-based compound to form the polymeric sorbent.

8. A method of sorbing an aldehyde, the method comprising:
   providing a polymeric sorbent of claim 1;
   sorbing the aldehyde on the polymeric sorbent, the aldehyde being of Formula (I)

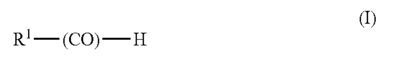

(I)

wherein $R^1$ is hydrogen, alkyl, vinyl, or aryl and wherein the molecular weight of the aldehyde is no greater than 200 grams/mole.

9. The method of claim 8, wherein $R^1$ is hydrogen or methyl.

10. A composition comprising:
   a) the polymeric sorbent of claim 1; and
   b) an aldehyde sorbed on the polymeric sorbent, the aldehyde being of Formula (I)

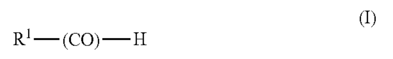

(I)

wherein $R^1$ is a hydrogen, alkyl, vinyl, or aryl group, and wherein the molecular weight of the aldehyde is no greater than 200 grams/mole.

11. A filter comprising the polymeric sorbent of claim 1.

12. The filter of claim 11, wherein the filter is an air purifier or respirator.

13. The filter of claim 11, wherein the filter captures an aldehyde.

14. The filter of claim 13, wherein the aldehyde is formaldehyde or acetaldehyde.

15. The filter of claim 11, wherein the filter further comprises a filter support comprising a substrate and wherein the polymeric sorbent is distributed on a major surface of the substrate, distributed throughout the substrate, or both.

* * * * *